(12) United States Patent
Lenhard et al.

(10) Patent No.: US 11,544,289 B2
(45) Date of Patent: Jan. 3, 2023

(54) INTERFACE CUSTOM RESOURCE DEFINITION FOR STATEFUL SERVICE MANAGEMENT OF CLUSTERS

(71) Applicant: SAP SE, Walldorf (DE)

(72) Inventors: Joerg Lenhard, Berlin (DE); Daniel Kirmse, Berlin (DE)

(73) Assignee: SAP SE, Walldorf (DE)

( * ) Notice: Subject to any disclaimer, the term of this patent is extended or adjusted under 35 U.S.C. 154(b) by 137 days.

(21) Appl. No.: 16/890,912

(22) Filed: Jun. 2, 2020

(65) Prior Publication Data

US 2021/0374156 A1 Dec. 2, 2021

(51) Int. Cl.
*G06F 16/27* (2019.01)
*G06F 16/23* (2019.01)

(52) U.S. Cl.
CPC ........ *G06F 16/273* (2019.01); *G06F 16/2379* (2019.01)

(58) Field of Classification Search
CPC ............................ G06F 16/273; G06F 16/2379
See application file for complete search history.

(56) References Cited

U.S. PATENT DOCUMENTS

| | | | | |
|---|---|---|---|---|
| 7,536,697 | B2 * | 5/2009 | Wiseman | G06F 16/258 719/315 |
| 10,326,744 | B1 * | 6/2019 | Nossik | H04L 9/0822 |
| 2010/0162383 | A1 * | 6/2010 | Linden | H04L 63/029 726/13 |
| 2021/0311763 | A1 * | 10/2021 | Beard | G06F 8/65 |
| 2021/0318913 | A1 * | 10/2021 | Moyer | G06F 8/60 |

OTHER PUBLICATIONS

Ahmed, Creating Custom Kubernetes Operators Dec. 9, 2019, Magalix, https://www.magalix.com/blog/creating-custom-kubernetes-operators).*
What is a Kubernetes Operator? May 21, 2020, Red Hat, https://www.redhat.com/en/topics/containers/what-is-a-kubernetes-operator.*
Pod Lifecycle Jul. 4, 2018 [captured on Sep. 27, 2018 by archive.org], kubernetes.io, (https://web.archive.org/web/20180927121540/https://kubernetes.io/docs/concepts/workloads/pods/pod-lifecycle/) hereinafter PodLife.*

* cited by examiner

*Primary Examiner* — Grace Park
(74) *Attorney, Agent, or Firm* — Schwegman Lundberg & Woessner, P.A.

(57) ABSTRACT

In an example embodiment, an additional interface customer resource definition (CRD), which operates in conjunction with the normal CRD, is utilized. The interface CRD may be called a service CRD. The service CRD provides an abstraction of the original CRD by abstracting away all technical details that no other services should depend upon. The service CRD provides a façade to the original CRD. Both are kept in sync by a component called an operator, which infers the specification of the original CRD on the basis of the specification of a given service CRD. Furthermore, status updates sent to the original CRD that are relevant to the dependent services are mirrored back to the corresponding service CRD. Correspondingly, status updates with technical details that are too specific for the dependent services are not mirrored back.

20 Claims, 8 Drawing Sheets

INTERFACE CUSTOM RESOURCE DEFINITION FOR STATEFUL SERVICE MANAGEMENT OF CLUSTERS

TECHNICAL FIELD

This document generally relates to in-memory database technology. More specifically, this document relates to an interface custom resource definition for stateful service management of clusters running an in-memory database.

BACKGROUND

An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access. One example in-memory database is the HANA® database from SAP SE, of Walldorf, Germany.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

One implementation of in-memory databases is to place them in a cloud and allow access to the cloud database as a service. For the HANA® cloud, this is known as HANA® as a service (HaaS). This allows customers to leverage the in-memory data processing and advanced analytic capabilities in the cloud.

Such services may allow applications to be developed using specialized in-memory database extended application services and deployed to a Cloud Foundry environment. Cloud Foundry is an open source, multi-cloud application platform as a service that allows for continuous delivery as it supports a full application development lifecycle, from initial deployment through testing stages to deployment. Container cloud Foundry utilizes a container-based architecture that runs application in any programming language over a variety of cloud service providers.

It is becoming more common to utilize a containerized implementation of a database, such as by using Kubernetes. Kubernetes is a system for automating deployment, scaling, and management of containerized applications. Application containerization is a virtualization method used by operating systems to deploy and run distributed applications without launching an entire virtual machine for each application.

Containerized applications have benefits over standard applications. When a standard application is installed on a server, libraries required by the application are also installed. Thus, if multiple applications are installed, the libraries on the server are an amalgamation of the libraries required by each of the multiple applications. If one application installs a different version of a library used by another application, the first installed version is overwritten. As a result, an application may use a version of a library that was not tested with the application, which may further result in unexpected behavior.

Kubernetes containers, by virtue of being so modular, are quite conducive to scaling of in-memory database instances. Kubernetes containers are called pods. Each pod is scheduled on a specific host. If the host becomes unavailable, Kubernetes automatically instantiates the instance on a different host, greatly easing maintenance.

A stateful service is one in which state data is persisted. An in-memory database may be used to persist the state for these stateful services, but they are managed in Kubernetes clusters using an application program interface (API) extension of a custom resource definition (CRD). A CRD is a set of parameters used by Kubernetes in managing the lifecycle of a Kubernetes pod. For optimal management by Kubernetes, the specification and status of these custom resources are typically enriched with additional technical details. At the same time, there are usually other services in the cluster that have to listen to and watch changes of the specification and status of the custom resources, such as services for monitoring, liveness, and metering. There is a high risk that these watching services become dependent on the specific structure of the technical details of the custom resource. This leads to it being technically challenging to easily update the CRD, as the dependent services must then also be updated as well, causing changes to become costly and cumbersome. Essentially the CRD becomes a moving target for service developers, who must constantly be watching for changes to the CRD and updating the services accordingly.

In an example embodiment, an additional interface customer resource definition (CRD), which operates in conjunction with the normal CRD, is utilized. The interface CRD may be called a service CRD. The service CRD provides an abstraction of the original CRD by abstracting away all technical details that no other services should depend upon. The service CRD provides a façade to the original CRD. Both are kept in sync by a component called an operator, which infers the specification of the original CRD on the basis of the specification of a given service CRD. Furthermore, status updates sent to the original CRD that are relevant to the dependent services are mirrored back to the corresponding service CRD. Correspondingly, status updates with technical details that are too specific for the dependent services are not mirrored back. Thus, it becomes possible to adapt and modify the original CRD and thus also the underlying pod (which may be, for example, running an in-memory database), without impacting the other stateful services.

For purposes of this disclosure, the concepts will be described in the context of the specific implementation of the underlying containers (pods) as containing instances of an in-memory database, such as HANA™. Additionally, the concepts will be described in the context of using Docker as the container framework and Kubernetes as the container architecture. One of ordinary skill in the art, however, will recognize that the concepts described in this disclosure may be applied to other types of applications running inside containers/pods, different types of container frameworks, and different types of container architectures, and the claims should not be interpreted as being limited to specific implementation unless expressly stated.

Figure 1:
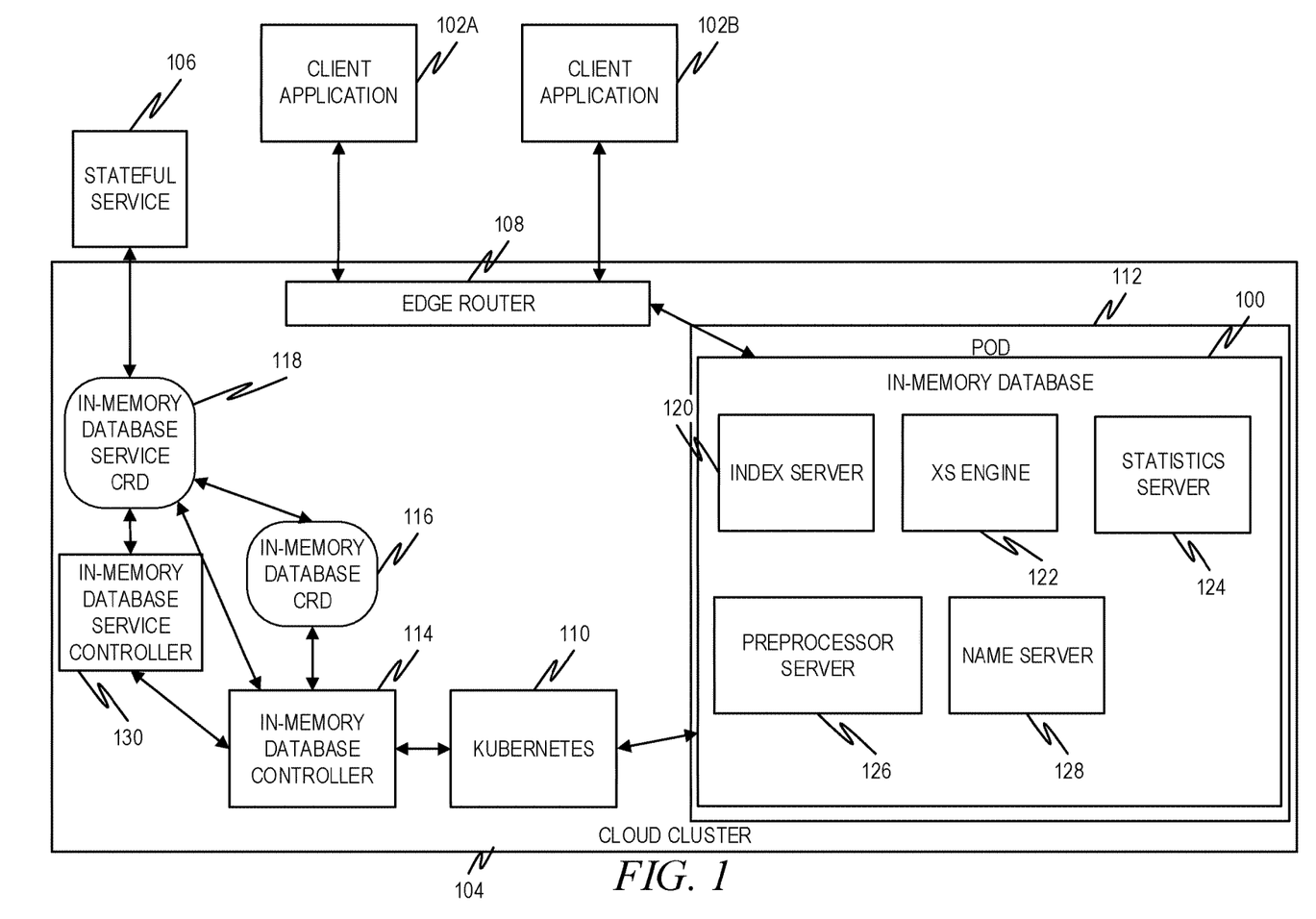
FIG. 1 is a diagram illustrating a cloud-based in-memory database management system, in accordance with an example embodiment.

FIG. 1 is a diagram illustrating a cloud-based in-memory database management system 100, including its client/external connection points, which can be kept stable in the case of disaster recovery to ensure stable service operations, in accordance with an example embodiment. Here, the in-memory database management system 100 may be coupled to one or more client applications 102A, 102B. The client applications 102A, 102B may communicate with the in-memory database management system 100 through a number of different protocols, including Structured Query Language (SQL), Multidimensional Expressions (MDX), Hypertext Transfer Protocol (HTTP), REST, and Hypertext Markup Language (HTML).

The in-memory database system 100 may be stored in cloud cluster 104. Also depicted is a stateful service 106, used to perform other operations on the in-memory database system 100, such as monitoring, checking liveness, or metering. The one or more client applications 102A, 102B may access the in-memory database system 100 via an edge router 108. On the back end, however, Kubernetes 110 is used to manage the specific instance of the in-memory database, which may be stored in a Kubernetes pod 112 or other container.

An in-memory database operator 114 may interface with Kubernetes 110 to create the pod 112 containing the in-memory database system 100. In doing so, and in managing the lifecycle of the pod 112, the in-memory database operator 114 may utilize an in-memory database CRD 116. As described briefly earlier, an in-memory database service CRD 118 may provide an abstraction of the in-memory database CRD 116 to allow updates to be performed on the in-memory database CRD 116 without requiring updates to the stateful service 106. The functioning of the in-memory database service CRD 118 will be described in more detail below.

The in-memory database system 100 may comprise a number of different components, including an index server 120, an XS engine 122, a statistics server 124, a preprocessor server 126, and a name server 128. These components may operate on a single computing device, or may be spread among multiple computing devices (e.g., separate servers).

The index server 120 contains the actual data and the engines for processing the data. It also coordinates and uses all the other servers.

The XS engine 122 allows clients to connect to the in-memory database system 100 using web protocols, such as HTTP.

The statistics server 124 collects information about status, performance, and resource consumption from all the other server components. The statistics server 124 can be accessed from the stateful service 106 to obtain the status of various alert monitors.

The preprocessor server 126 is used for analyzing text data and extracting the information on which text search capabilities are based.

The name server 128 holds information about the database topology. This is used in a distributed system with instances of the database on different hosts. The name server 128 knows where the components are running and which data is located on which server.

Figure 2:
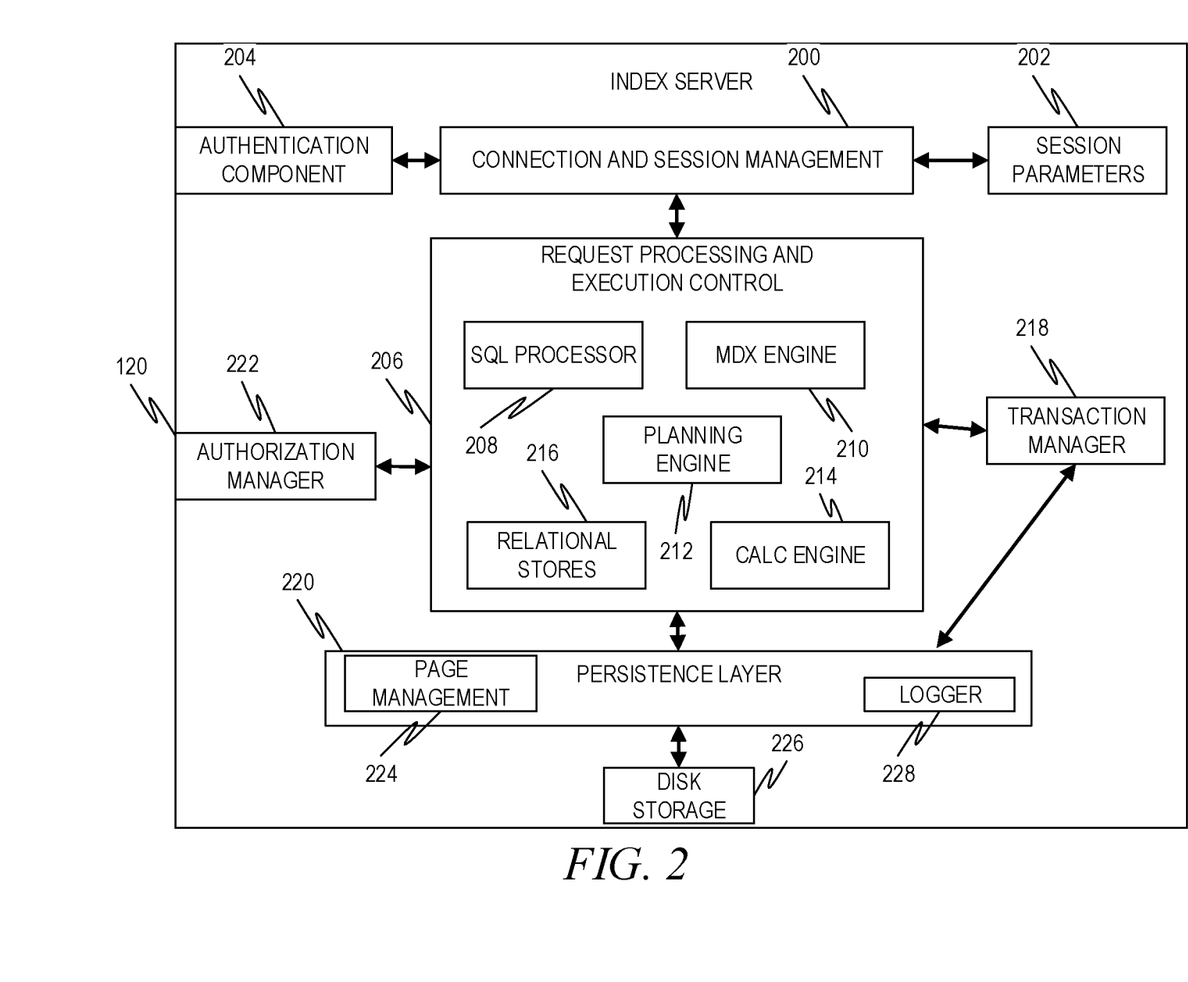
FIG. 2 is a diagram illustrating an index server, in accordance with an example embodiment.

FIG. 2 is a diagram illustrating an index server 120, in accordance with an example embodiment. Specifically, the index server 120 of FIG. 1 is depicted in more detail. The index server 120 includes a connection and session management component 200, which is responsible for creating and managing sessions and connections for the database clients. Once a session is established, clients can communicate with the database system 100 using SQL statements. For each session, a set of session parameters 202 may be maintained, such as auto-commit, current transaction isolation level, etc. Users (e.g., system administrators, developers) may be authenticated by the database system 100 itself (e.g., by logging in with user name and password, using an authentication component 204), or authentication can be delegated to an external authentication provider such as a Lightweight Directory Access Protocol (LDAP) directory.

The client requests can be analyzed and executed by a set of components summarized as request processing and execution control 206. An SQL processor 208 checks the syntax and semantics of the client SQL statements and generates a logical execution plan. Multidimensional expressions (MDX) are a language for querying and manipulating multidimensional data stored in online analytical processing (OLAP) cubes. As such, an MDX engine 210 is provided to allow for the parsing and executing of MDX commands. A planning engine 212 allows applications (e.g., financial planning applications) to execute basic planning operations in the database layer. One such operation is to create a new version of a dataset as a copy of an existing dataset, while applying filters and transformations.

A calc engine 214 implements the various SQL script and planning operations. The calc engine 214 creates a logical execution plan for calculation models derived from SQL scripts, MDX, planning, and domain-specific models. This logical execution plan may include, for example, breaking up a model into operations that can be processed in parallel.

The data is stored in relational stores 216, which implement a relational database in main memory.

Each SQL statement may be processed in the context of a transaction. New sessions are implicitly assigned to a new transaction. A transaction manager 218 coordinates database transactions, controls transactional isolation, and keeps track of running and closed transactions. When a transaction is committed or rolled back, the transaction manager 218 informs the involved engines about this event so they can execute needed actions. The transaction manager 218 also cooperates with a persistence layer 220 to achieve atomic and durable transactions.

An authorization manager 222 is invoked by other database system components to check whether the user has the specified privileges to execute the requested operations. The database system 100 allows for the granting of privileges to users or roles. A privilege grants the right to perform a specified operation on a specified object.

The persistence layer 220 ensures that the database is restored to the most recent committed state after a restart and that transactions are either completely executed or completely undone. To achieve this goal in an efficient way, the persistence layer 220 uses a combination of write-ahead logs, shadow paging, and save points. The persistence layer 220 also offers a page management interface 224 for writing and reading data to and from a separate disk storage 226, and also contains a logger 228 that manages the transaction log. Log entries can be written implicitly by the persistence layer 220 when data is written via the persistence interface or explicitly by using a log interface.

Figure 3:
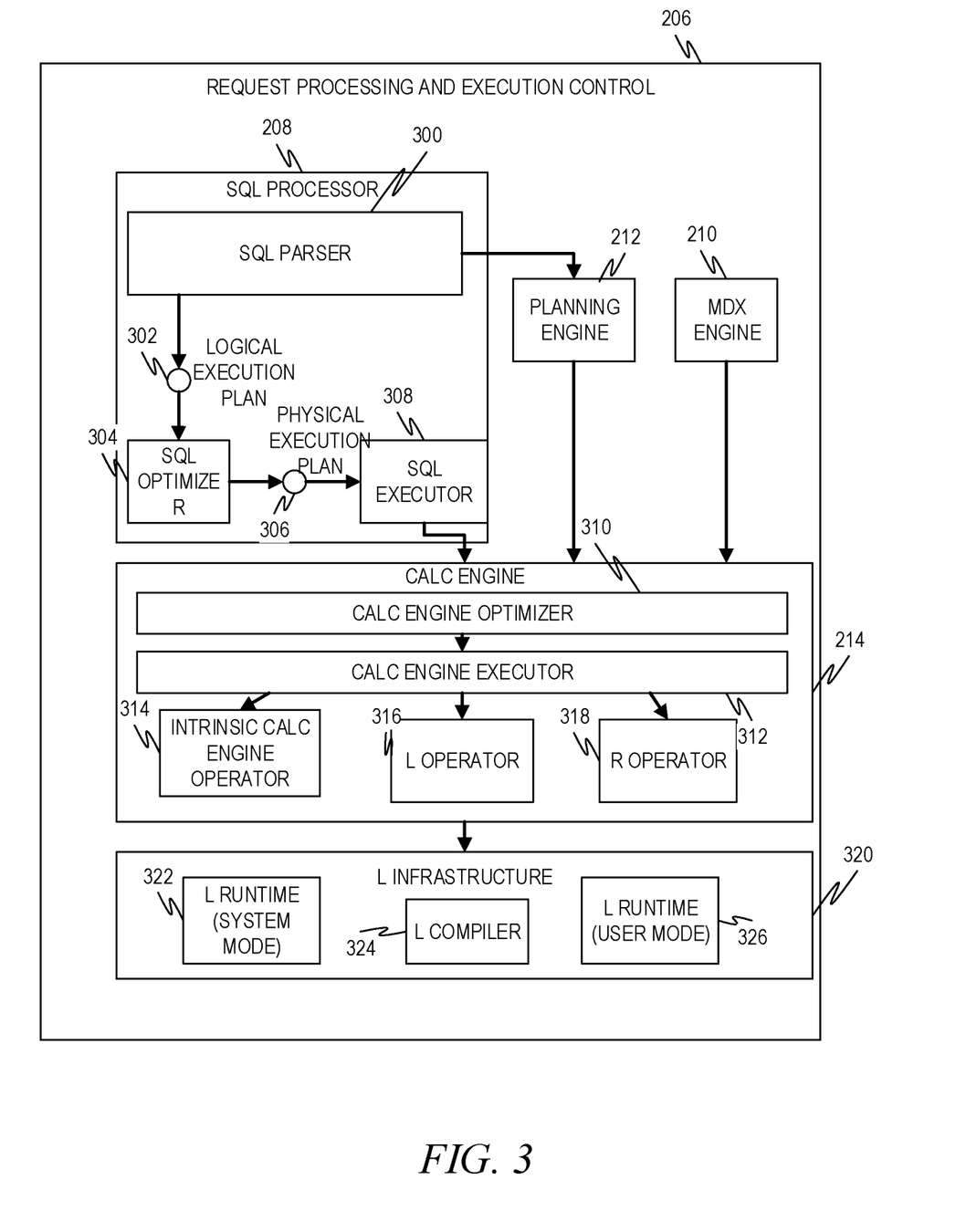
FIG. 3 is a diagram illustrating a request processing and execution control, in accordance with an example embodiment.

FIG. 3 is a diagram illustrating a request processing and execution control 206, in accordance with an example embodiment. This diagram depicts the request processing and execution control 206 of FIG. 2 in more detail. The SQL processor 208 contains an SQL parser 300, which parses an SQL statement and generates a logical execution plan 302, which it passes to an SQL optimizer 304. The SQL optimizer 304 then optimizes the logical execution plan 302 and converts it to a physical execution plan 306, which it then passes to an SQL executor 308. The calc engine 214 implements the various SQL script and planning operations, and includes a calc engine optimizer 310, which optimizes the operations, and a calc engine executor 312, which executes the operations, as well as an intrinsic calc engine operator 314, an L operator 316, and an R operator 318.

An L infrastructure 320 includes a number of components to aid in the running of L procedures, including an L-runtime (system mode) 322, an L compiler 324, and an L-runtime (user mode) 326.

Figure 4:
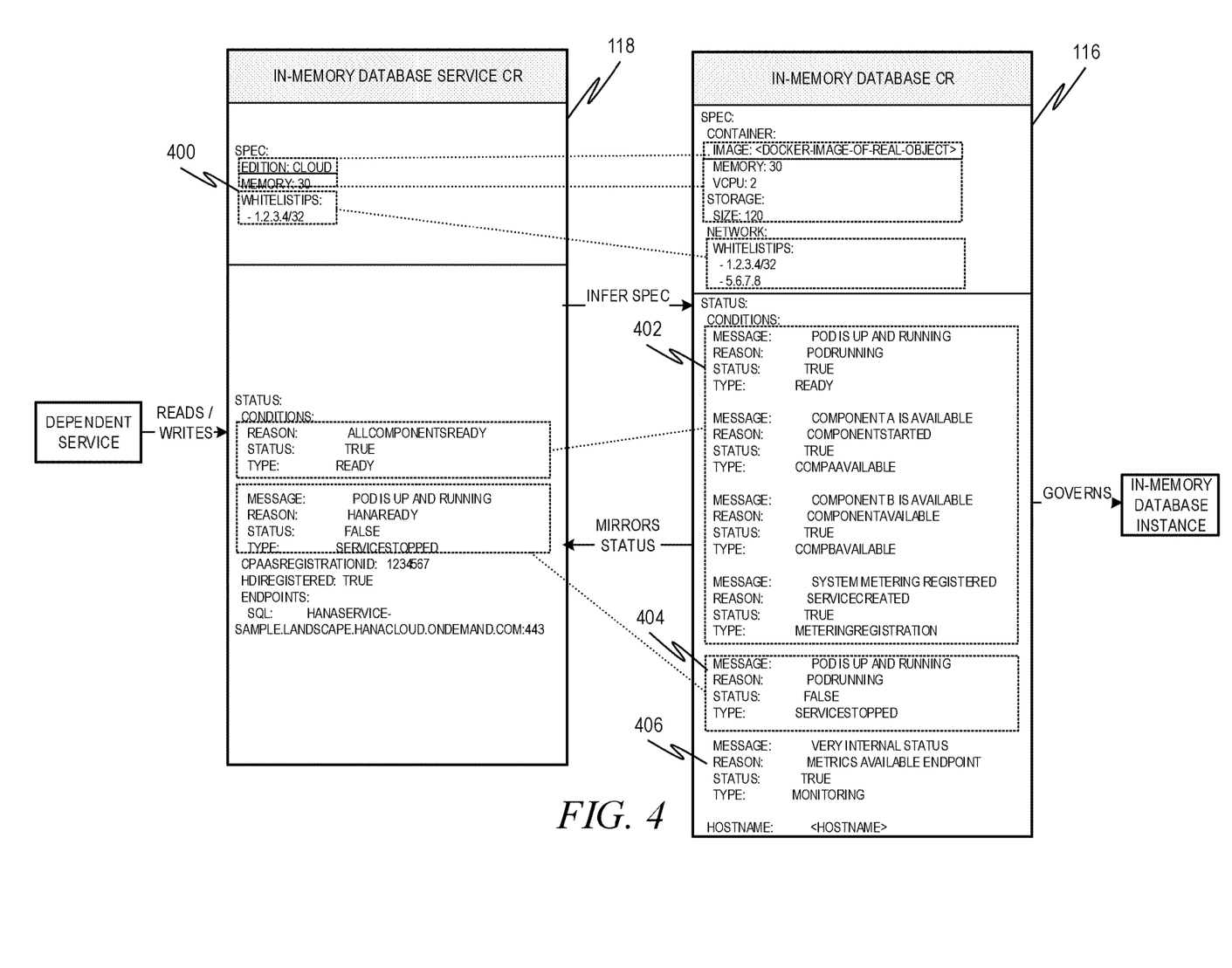
FIG. 4 is a block diagram illustrating the abstraction of an in-memory database CRD using an in-memory database service CRD, in accordance with an example embodiment

As described earlier, the in-memory database service CRD 118 provides an abstraction of the in-memory database CRD 116. An in-memory database service controller 130 monitors execution of the in-memory database operator 114 and receives mirrored status updates from the in-memory database operator 114. FIG. 4 is a block diagram illustrating the abstraction of an in-memory database CRD 116 using an in-memory database service CRD 118, in accordance with an example embodiment. Specifically, the in-memory database CRD 116 infers the spec 400 from the in-memory database service CRD 118, while the in-memory database CRD 116 mirrors the statuses, such as status 402 and 404, to the in-memory database service CRD 118, while it doesn't mirror other statuses, such as status 406, of the in-memory database CRD 116. Inferring the spec 400 includes taking attributes from the spec 400 on the in-memory database service CRD 118 and inserting those attributes into the in-memory database CRD 116. These attributes may include certain key attributes, such as memory size and a list of whitelisted IP addresses. The stateful service 106 performs reads and writes on the in-memory database service CRD 118, while the in-memory database CRD 116 governs the pod 112.

Figure 5:
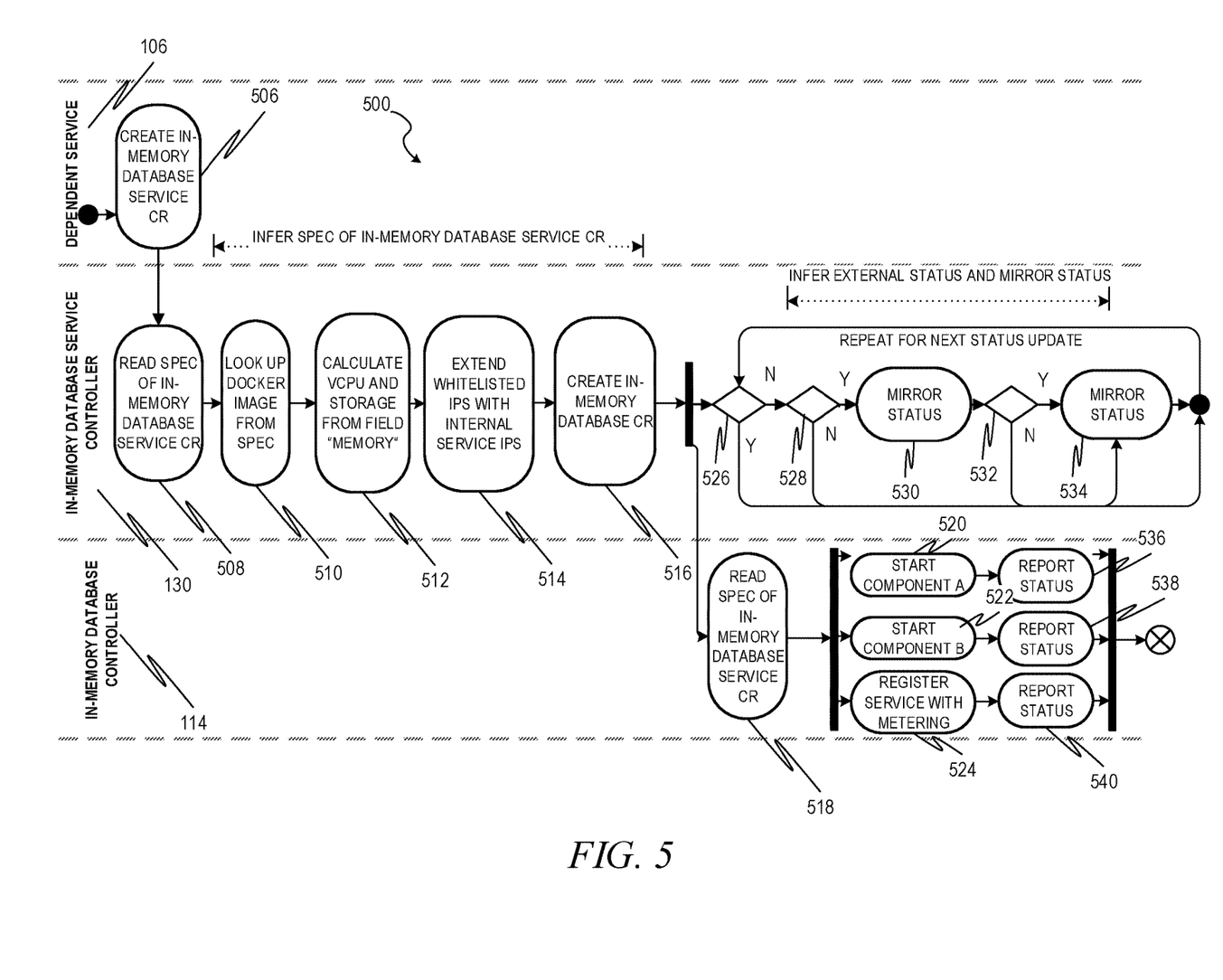
FIG. 5 is a sequence diagram illustrating a method for performing in-memory database CRD abstraction, in accordance with an example embodiment.

FIG. 5 is a sequence diagram illustrating a method 500 for performing in-memory database CRD abstraction, in accordance with an example embodiment. The components/entity involved include the stateful service 106, in-memory database service CRD controller 130 and in-memory database operator 114. At operation 506, the stateful service 106 creates the in-memory database service CRD 118. Each Kubernetes resource has several parts. These parts include an API version, a kind, metadata, and a spec. While the API version, kind, and metadata are required by the Kubernetes API server to schedule workloads and notify the proper controllers about changes, the spec describes the corresponding Kubernetes object and its traits. For a pod, there is a "containers" section in the spec holding a list of Docker images to be started within the pod.

At operation 508, the in-memory database service CRD controller 130 reads the spec of the in-memory database service CRD 118. This may be performed by querying the Kubernetes API server about changes to a concrete custom resource of the kind matching the in-memory database service CRD 118. The spec arrives as a data collection in the returned data structure.

At operation 510, the in-memory database service CRD controller 130 looks up the Docker image in the spec. The docker image maybe identified by the spec from the in-memory database CRD 116. For example, in FIG. 4 the spec 400 indicates that the Docker image is identified as "cloud", and thus the identification "cloud" may be used to retrieve the image. At operation 512, the in-memory database service CRD controller 130 calculates a vCPU and storage from a memory field for the Docker image. A vCPU is a virtual core CPU in a cloud provider's virtual machine. A Docker container could be started with limits for CPU and memory to control the resource consumption on the machines. The in-memory database service CRD controller 130 is able to read the field "memory" from the in-memory database service CRD 118 (as depicted in FIG. 4) and computes the necessary vCPU and storage size to fill the respective fields in the in-memory database CRD 116, which in the end will be transferred to a pod resource to configure a Docker image.

In an example embodiment, only attempts from a whitelisted Internet Protocol (IP) address are allowed. As such, at operation 514, the whitelisted IP addresses are extended with internal service IP addresses that control the access to the in-memory database systems. At operation 516, the in-memory database service CRD controller 130 creates the in-memory database CRD 116

The in-memory database service CRD controller 130 can, at operation 518, read the spec of the in-memory database service CRD and start components, such as by starting component A at operation 520, starting component B at operation 522, and registering the service with metering at 524. It may then monitor the in-memory database operator 114 for status updates.

For its part, the in-memory database operator 114 may cycle through status updates being generated in the system. The following operations may be performed for each status update. At operation 526, it is determined whether the status update is too specific to mirror. This determination may be based on criteria hard-coded into the in-memory database operator 114 or referenced in a configuration file accessed by the in-memory database operator 114. For example, a list of status types that are too specific to mirror may be hard-coded into the in-memory database operator 114 or stored in the configuration file, and operation 526 may involve comparing the status type of the status update being examined to determine if it matches one of the status types that are too specific to mirror. In an example embodiment, the requesting (dependent) service may provide input as to which status types should be mirrored.

If so, then no status update is mirrored. If not, however, then at operation 528 it is determined whether a ready status has been detected. A ready status may be defined as an indication that all conditions within a status are true. Referring back to FIG. 4, status 402 contains four conditions. Only once all of these conditions are true, as are reflected in this figure, will the status be mirrored at operation 530. If any one of these conditions is false, then the corresponding status will not be mirrored (until all of the conditions are true). Status 404 is an example of a status whose lone condition is false, and thus it will not be mirrored.

Status 406 is an example of a status that is considered too specific to mirror.

Referring back to FIG. 5, a special status update indicating that a service is stopped may be detected, and if that is the case, then the stopped service update should also be mirrored to the in-memory database service CRD controller 130. Thus, at operation 532 it is determined if a stopped status indication has been detected. If so, then at operation 534 the stopped service update is mirrored to the in-memory database service CRD controller 130.

Once receiving the status (updates), the in-memory database service CRD controller 130 may report the statuses at operations 536, 538, and 540.

Figure 6:
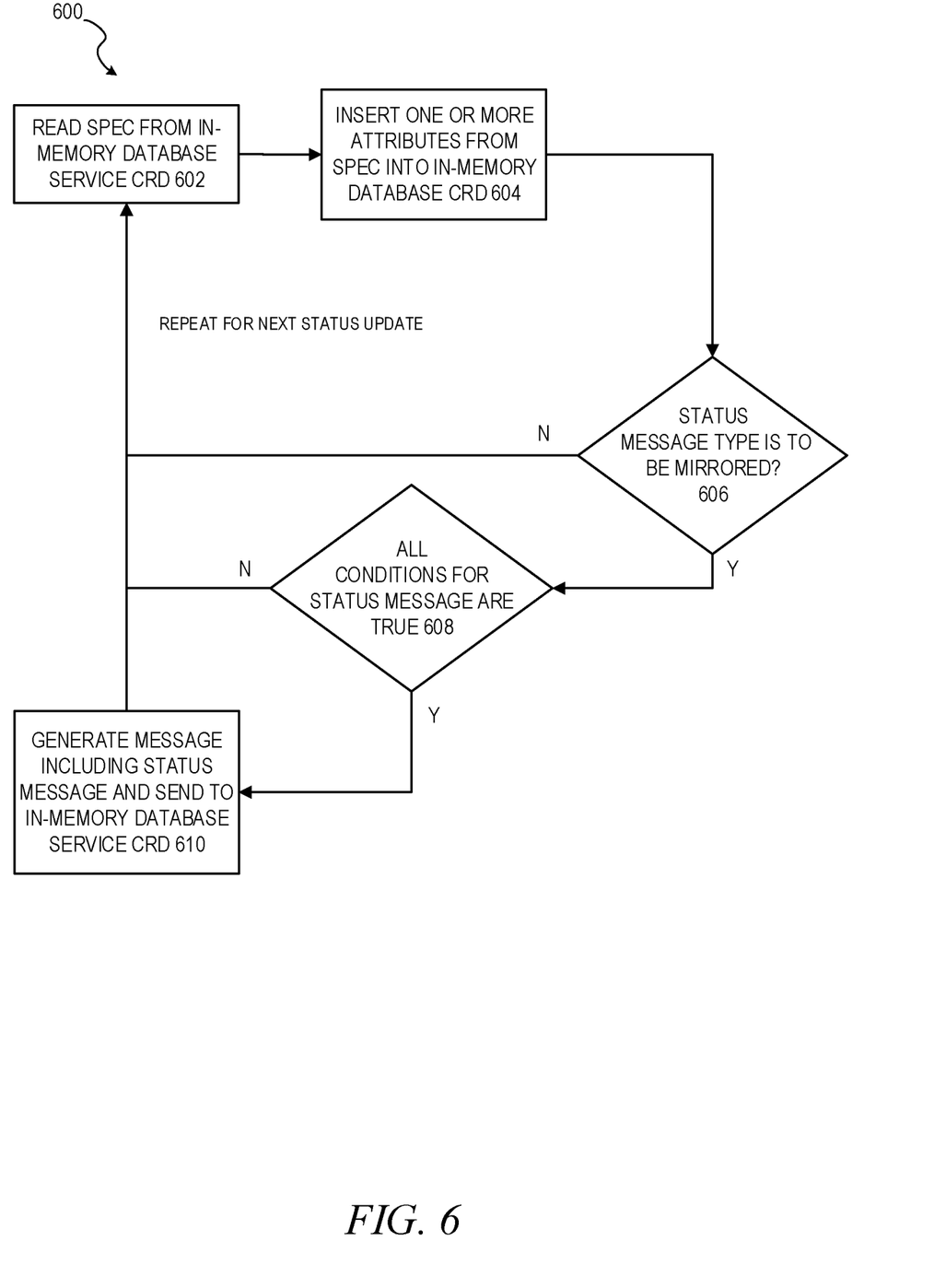
FIG. 6 is a flow diagram illustrating a method for operating an instance of an in-memory database in accordance with an example embodiment.

FIG. 6 is a flow diagram illustrating a method 600 for operating an instance of an in-memory database in accordance with an example embodiment. In an example embodiment, the method 600 may be performed by an in-memory database operator. At operation 602, a specification is read from an in-memory database service custom resource definition (CRD). At operation 604, one or more attributes from the specification are inserted into an in-memory database CRD. At operation 606, the in-memory database operator monitors for status messages from an instance of an in-memory database. A loop is then begun for each status message generated from the instance of the in-memory database. At operation 606 it is determined if a type for the status message is defined by the in-memory database operator as a type to mirror. If not, then nothing happens. If so, then at operation 608 it is determined if all conditions, defined in the in-memory database CRD, for the status message are true. If not, nothing happens. If so, then at operation 610 a message is generated and sent to an in-memory database service controller corresponding to the in-memory database service CRD, the message including the status message.

EXAMPLES

Example 1. A system comprising:
  at least one hardware processor; and
  a computer-readable medium storing instructions that, when executed by the at least one hardware processor, cause the at least one hardware processor to perform operations comprising:
    reading, by an in-memory database operator, a specification from an in-memory database service custom resource definition (CRD);
    inserting, by the in-memory database operator, one or more attributes from the specification into an in-memory database CRD;
    monitoring for status messages from an instance of an in-memory database; and
    for each status message generated from the instance of the in-memory database;
      determining if a type for the status message is defined by the in-memory database operator as a type to mirror; and
      in response to a determination that the type for the status message is defined as a type to mirror, causing a message to be generated and sent to an in-memory database service controller corresponding to the in-memory database interface CRD, the message including a status message.

Example 2. The system of Example 1, wherein the in-memory database service controller reads the specification from the in-memory database service CRD and runs one or more components based on the specification.

Example 3. The system of Example 2, wherein the one or more components read one or more mirrored status messages and generate status reports based upon the one or more mirrored status messages.

Example 4. The system of any of Examples 1-3, wherein the in-memory database service CRD is created by a service that is dependent on the instance of the in-memory database.

Example 5. The system of any of Examples 1-4, wherein the in-memory database operator creates the instance of the in-memory database based on the in-memory database CRD.

Example 6. The system of Example 5, wherein the operations further comprise, for each status message:
  determining whether values for all conditions, defined in the in-memory database CRD, of the status message are true; and
  wherein the causing a message to be generated and sent to the in-memory database service controller corresponding to the in-memory database interface CRD is also performed in response to the determination that the values for all conditions, defined in the in-memory database CRD, are true.

Example 7. The system of Example 6, wherein the conditions include that all components are ready.

Example 8. A method comprising:
  reading, by an in-memory database operator, a specification from an in-memory database service custom resource definition (CRD);
  inserting, by the in-memory database operator, one or more attributes from the specification into an in-memory database CRD;
  monitoring for status messages from an instance of an in-memory database; and
  for each status message generated from the instance of the in-memory database;
    determining if a type for the status message is defined by the in-memory database operator as a type to mirror; and
    in response to a determination that the type for the status message is defined as a type to mirror, causing a message to be generated and sent to an in-memory database service controller corresponding to the in-memory database interface CRD, the message including a status message.

Example 9. The method of Example 8, wherein the in-memory database service controller reads the specification from the in-memory database service CRD and runs one or more components based on the specification.

Example 10. The method of Example 9, wherein the one or more components read one or more mirrored status messages and generate status reports based upon the one or more mirrored status messages.

Example 11. The method of any of Examples 8-10, wherein the in-memory database service CRD is created by a service that is dependent on the instance of the in-memory database.

Example 12. The method of any of Examples 8-11, wherein the in-memory database operator creates the instance of the in-memory database based on the in-memory database CRD.

Example 13. The method of Example 12, further comprising, for each status message:

determining whether values for all conditions, defined in the in-memory database CRD, of the status message are true; and wherein the causing a message to be generated and sent to the in-memory database service controller corresponding to the in-memory database interface CRD is also performed in response to the determination that the values for all conditions, defined in the in-memory database CRD, are true.

Example 14. The method of Example 13, wherein the conditions include that all components are ready.

Example 15. A non-transitory machine-readable medium storing instructions which, when executed by one or more processors, cause the one or more processors to perform operations comprising:

reading, by an in-memory database operator, a specification from an in-memory database service custom resource definition (CRD);

inserting, by the in-memory database operator, one or more attributes from the specification into an in-memory database CRD;

monitoring for status messages from an instance of an in-memory database; and for each status message generated from the instance of the in-memory database:

determining if a type for the status message is defined by the in-memory database operator as a type to mirror; and in response to a determination that the type for the status message is defined as a type to mirror, causing a message to be generated and sent to an in-memory database service controller corresponding to the in-memory database interface CRD, the message including a status message.

Example 16. The non-transitory machine-readable medium storing instructions of Example 15, wherein the in-memory database service controller reads the specification from the in-memory database service CRD and runs one or more components based on the specification.

Example 17. The non-transitory machine-readable medium storing instructions of Example 16, wherein the one or more components read one or more mirrored status messages and generate status reports based upon the one or more mirrored status messages.

Example 18. The non-transitory machine-readable medium storing instructions of any of Examples 15-17, wherein the in-memory database service CRD is created by a service that is dependent on the instance of the in-memory database.

Example 19. The non-transitory machine-readable medium storing instructions of any of Examples 15-18, wherein the in-memory database operator creates the instance of the in-memory database based on the in-memory database CRD.

Example 20. The non-transitory machine-readable medium storing instructions of Example 19, wherein the operations further comprise, for each status message:

determining whether values for all conditions, defined in the in-memory database CRD, of the status message are true; and wherein the causing a message to be generated and sent to the in-memory database service controller corresponding to the in-memory database interface CRD is also performed in response to the determination that the values for all conditions, defined in the in-memory database CRD, are true.

Figure 7:
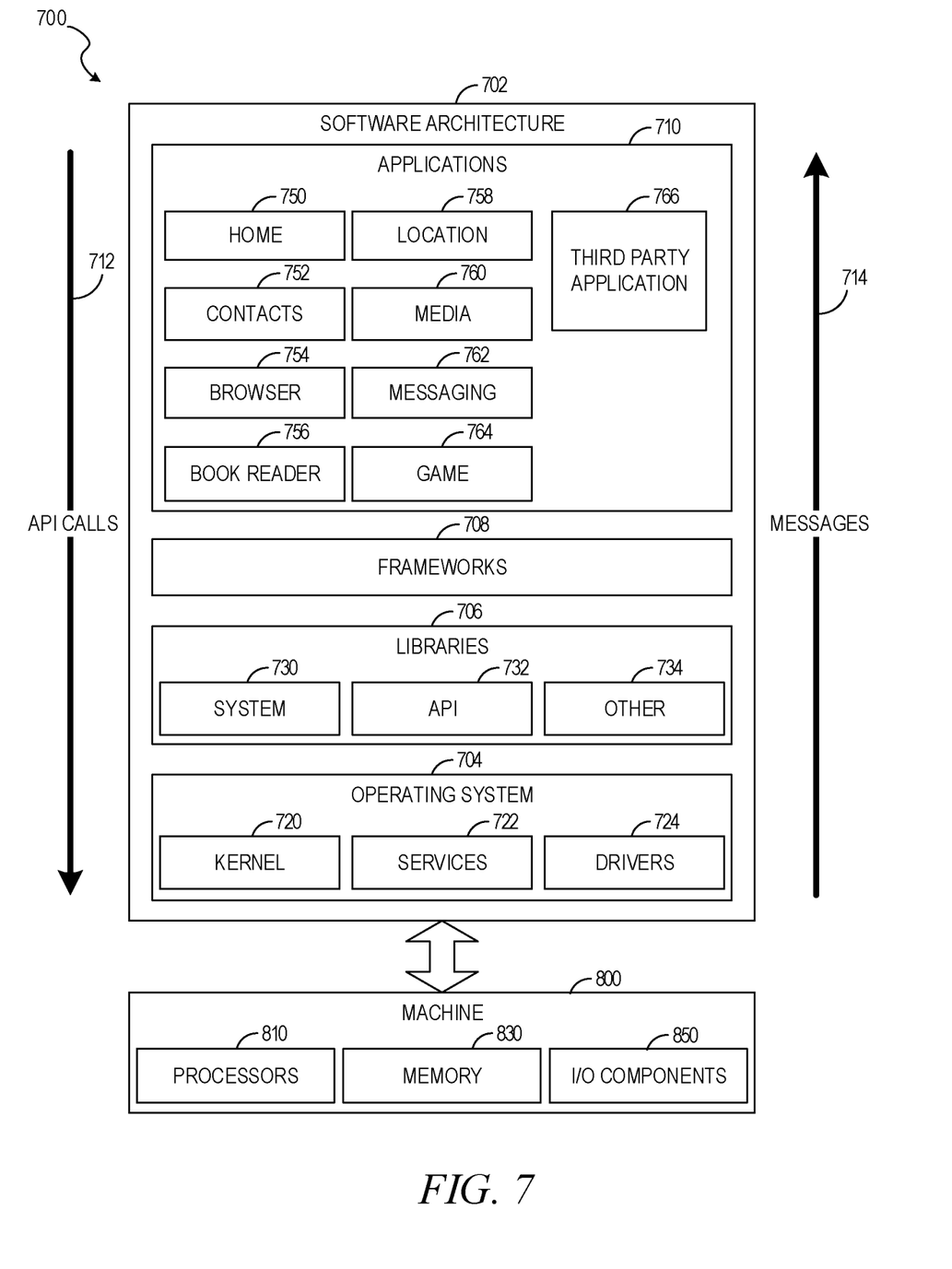
FIG. 7 is a block diagram illustrating an architecture of software, which can be installed on any one or more of the devices described above.

FIG. 7 is a block diagram 700 illustrating a software architecture 702, which can be installed on any one or more of the devices described above. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example architecture, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke API calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphical user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
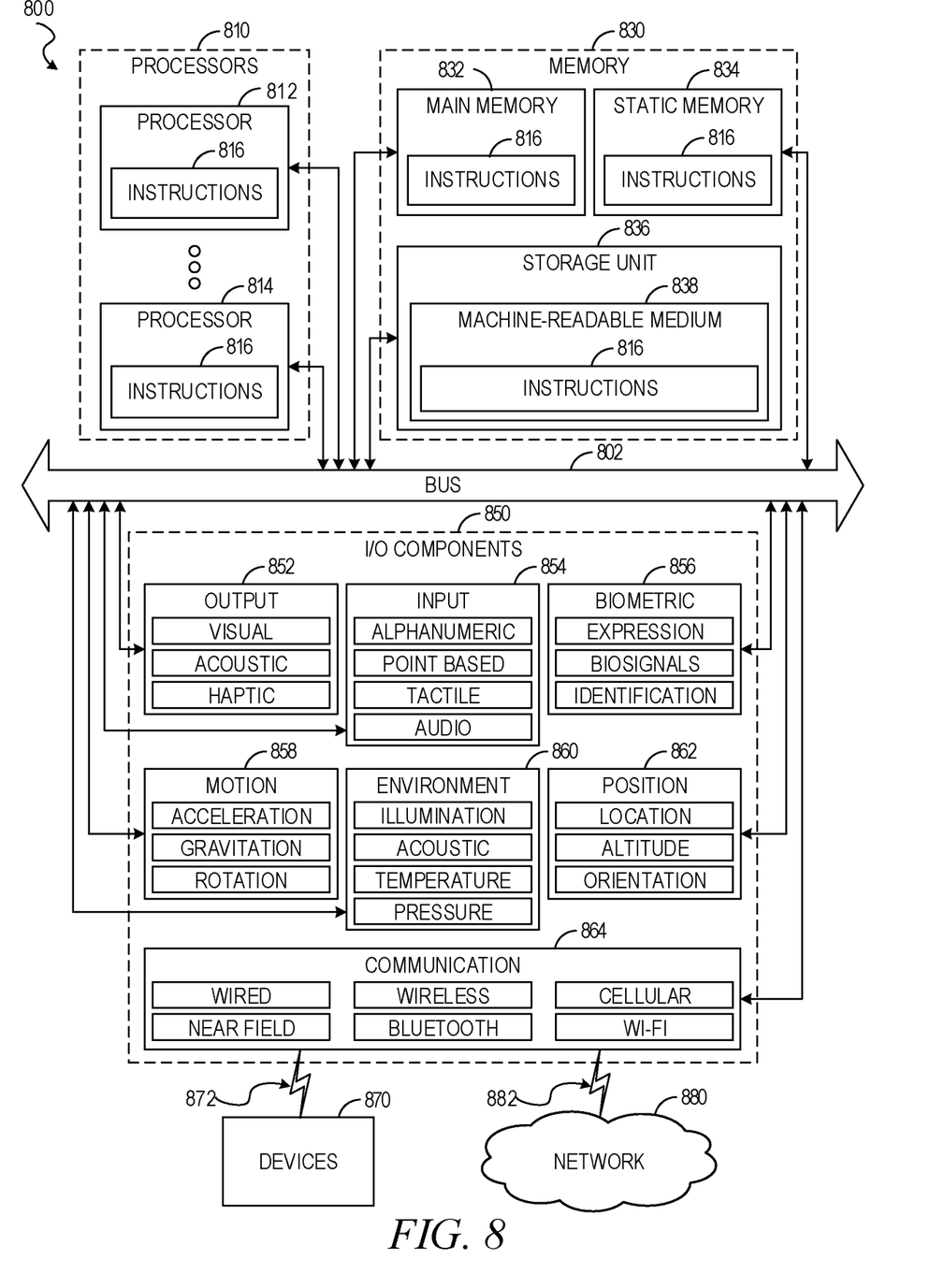
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the methods of FIG. 6. Additionally, or alternatively, the instructions 816 may implement FIGS. 1-6 and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions 816 contemporaneously. Although FIG. 8 shows multiple processors 810, the machine 800 may include a single processor 812 with a single core, a single processor 812 with multiple cores (e.g., a multi-core processor 812), multiple processors 812, 814 with a single core, multiple processors 812, 814 with multiple cores, or any combination thereof.

The memory 830 may include a main memory 832, a static memory 834, and a storage unit 836, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., coupled via a USB).

Moreover, the communication components 864 may detect identifiers or include components operable to detect identifiers. For example, the communication components 864 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

The various memories (e.g., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
at least one hardware processor; and
a computer-readable medium storing instructions that, when executed by the at least one hardware processor, cause the at least one hardware processor to perform operations comprising:
reading, by an in-memory database controller, a specification from an in-memory database service custom resource definition (CRD);
inserting, by the in-memory database controller, one or more attributes from the specification into an in-memory database CRD;
monitoring for status messages from an instance of an in-memory database; and
for each of one or more status messages generated from the instance of the in-memory database:
determining if a type for the status message is defined by the in-memory database controller as a type that is not to be mirrored back to the in-memory database service custom resource definition; and
in response to a determination that the type for the status message is not defined as a type that is not to be mirrored back to the in-memory database service CRD, causing a message to be generated and sent to an in-memory database service controller corresponding to the in-memory database service CRD, the message including a second status message.

2. The system of claim 1, wherein the in-memory database service controller reads the specification from the in-memory database service CRD and runs one or more components based on the specification.

3. The system of claim 2, wherein the one or more components read one or more mirrored status messages and generate status reports based upon the one or more mirrored status messages.

4. The system of claim 1, wherein the in-memory database service CRD is created by a service that is dependent on the instance of the in-memory database.

5. The system of claim 1, wherein the in-memory database controller manages the instance of the in-memory database based on the in-memory database CRD.

6. The system of claim 5, wherein the operations further comprise, for each of the one or more status messages:
determining whether values for all conditions, defined in the in-memory database CRD, of the status message are true; and
wherein the causing a message to be generated and sent to the in-memory database service controller corresponding to the in-memory database service CRD is also performed in response to the determination that the values for all conditions, defined in the in-memory database CRD, are true.

7. The system of claim 6, wherein the conditions include that all components are ready.

8. A method comprising:
reading, by an in-memory database controller, a specification from an in-memory database service custom resource definition (CRD);
inserting, by the in-memory database controller, one or more attributes from the specification into an in-memory database CRD;
monitoring for status messages from an instance of an in-memory database; and
for each of one or more status messages generated from the instance of the in-memory database:
determining if a type for the status message is defined by the in-memory database controller as a type that is not to be mirrored back to the in-memory database service custom resource definition; and
in response to a determination that the type for the status message is not defined as a type that is not to be mirrored back to the in-memory database service CRD, causing a message to be generated and sent to an in-memory database service controller corresponding to the in-memory database service CRD, the message including a second status message.

9. The method of claim 8, wherein the in-memory database service controller reads the specification from the in-memory database service CRD and runs one or more components based on the specification.

10. The method of claim 9, wherein the one or more components read one or more mirrored status messages and generate status reports based upon the one or more mirrored status messages.

11. The method of claim 8, wherein the in-memory database service CRD is created by a service that is dependent on the instance of the in-memory database.

12. The method of claim 8, wherein the in-memory database controller manages the instance of the in-memory database based on the in-memory database CRD.

13. The method of claim 12, further comprising, for each of the one or more status messages:
determining whether values for all conditions, defined in the in-memory database CRD, of the status message are true; and
wherein the causing a message to be generated and sent to the in-memory database service controller corresponding to the in-memory database service CRD is also performed in response to the determination that the values for all conditions, defined in the in-memory database CRD, are true.

14. The method of claim 13, wherein the conditions include that all components are ready.

15. A non-transitory machine-readable medium storing instructions which, when executed by one or more processors, cause the one or more processors to perform operations comprising:
reading, by an in-memory database controller, a specification from an in-memory database service custom resource definition (CRD);
inserting, by the in-memory database controller, one or more attributes from the specification into an in-memory database CRD;
monitoring for status messages from an instance of an in-memory database; and
for each of one or more status messages generated from the instance of the in-memory database:
determining if a type for the status message is defined by the in-memory database controller as a type that is not to be mirrored back to the in-memory database service custom resource definition; and in response to a determination that the type for the status message is not defined as a type that is not to be mirrored back to the in-memory database service CRD, causing a message to be generated and sent to an in-memory database service controller corresponding to the in-memory database service CRD, the message including a second status message.

16. The non-transitory machine-readable medium storing instructions of claim 15, wherein the in-memory database service controller reads the specification from the in-memory database service CRD and runs one or more components based on the specification.

17. The non-transitory machine-readable medium storing instructions of claim 16, wherein the one or more components read one or more mirrored status messages and generate status reports based upon the one or more mirrored status messages.

18. The non-transitory machine-readable medium storing instructions of claim 15, wherein the in-memory database service CRD is created by a service that is dependent on the instance of the in-memory database.

19. The non-transitory machine-readable medium storing instructions of claim 15, wherein the in-memory database controller manages the instance of the in-memory database based on the in-memory database CRD.

20. The non-transitory machine-readable medium storing instructions of claim 19, wherein the operations further comprise, for each of the one or more status messages:
- determining whether values for all conditions, defined in the in-memory database CRD, of the status message are true; and
- wherein the causing a message to be generated and sent to the in-memory database service controller corresponding to the in-memory database service CRD is also performed in response to the determination that the values for all conditions, defined in the in-memory database CRD, are true.

* * * * *